May 9, 1933. D. M. WATSON ET AL 1,908,618
HAND TRUCK
Filed March 11, 1925 3 Sheets-Sheet 2
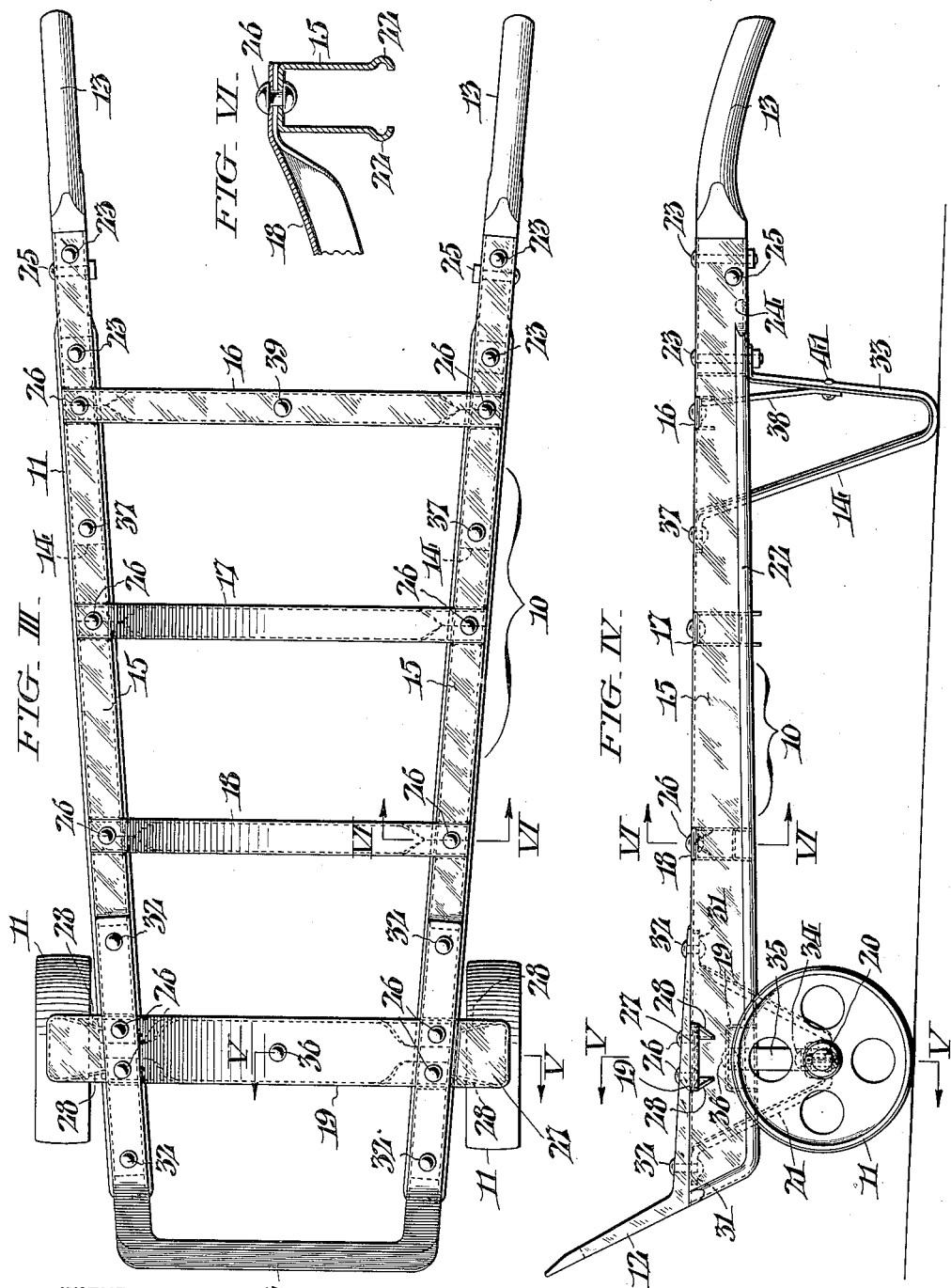
WITNESSES
INVENTORS:
David M. Watson &
Gonzalo C. Munoz,
BY
ATTORNEYS.

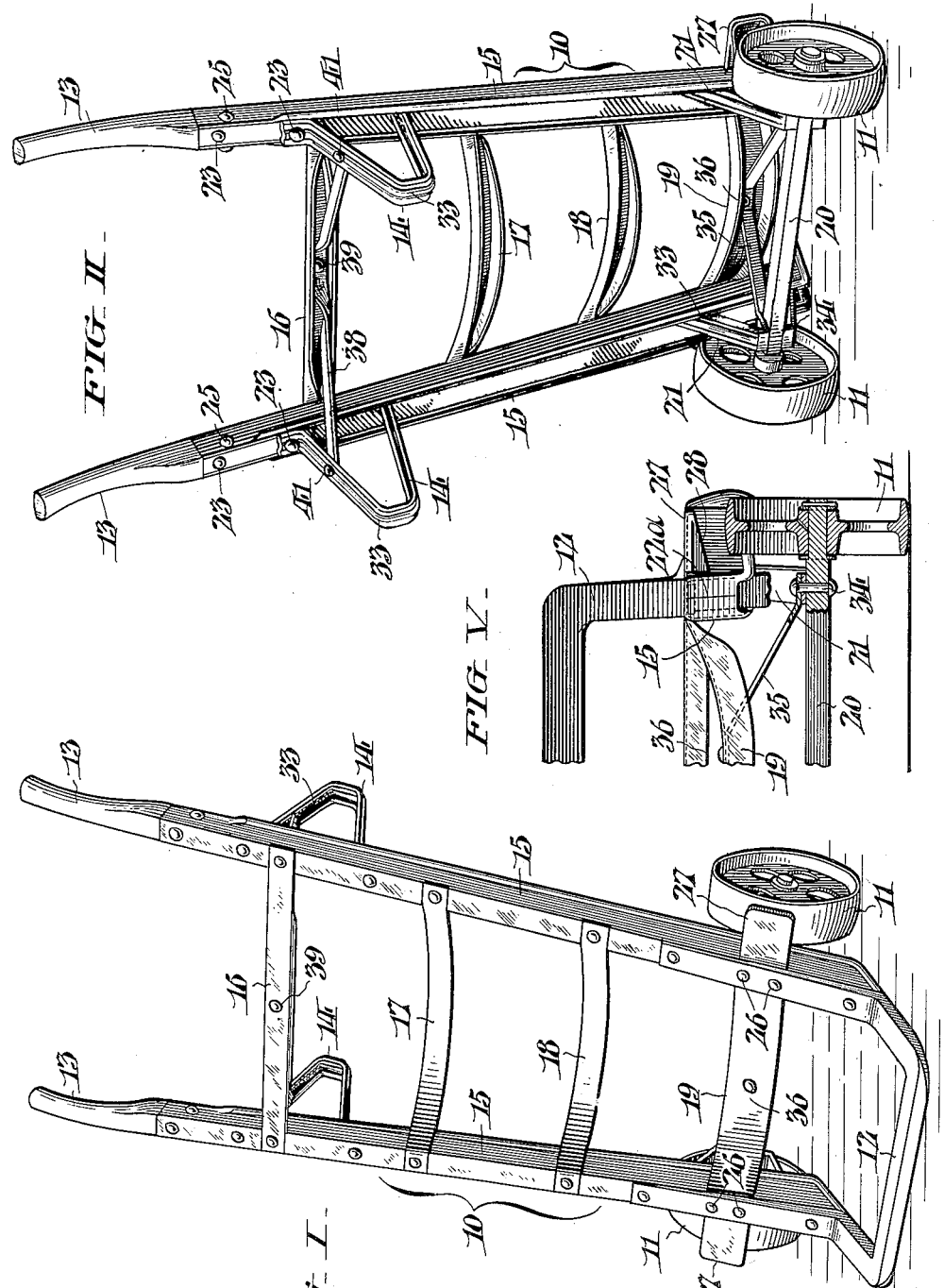

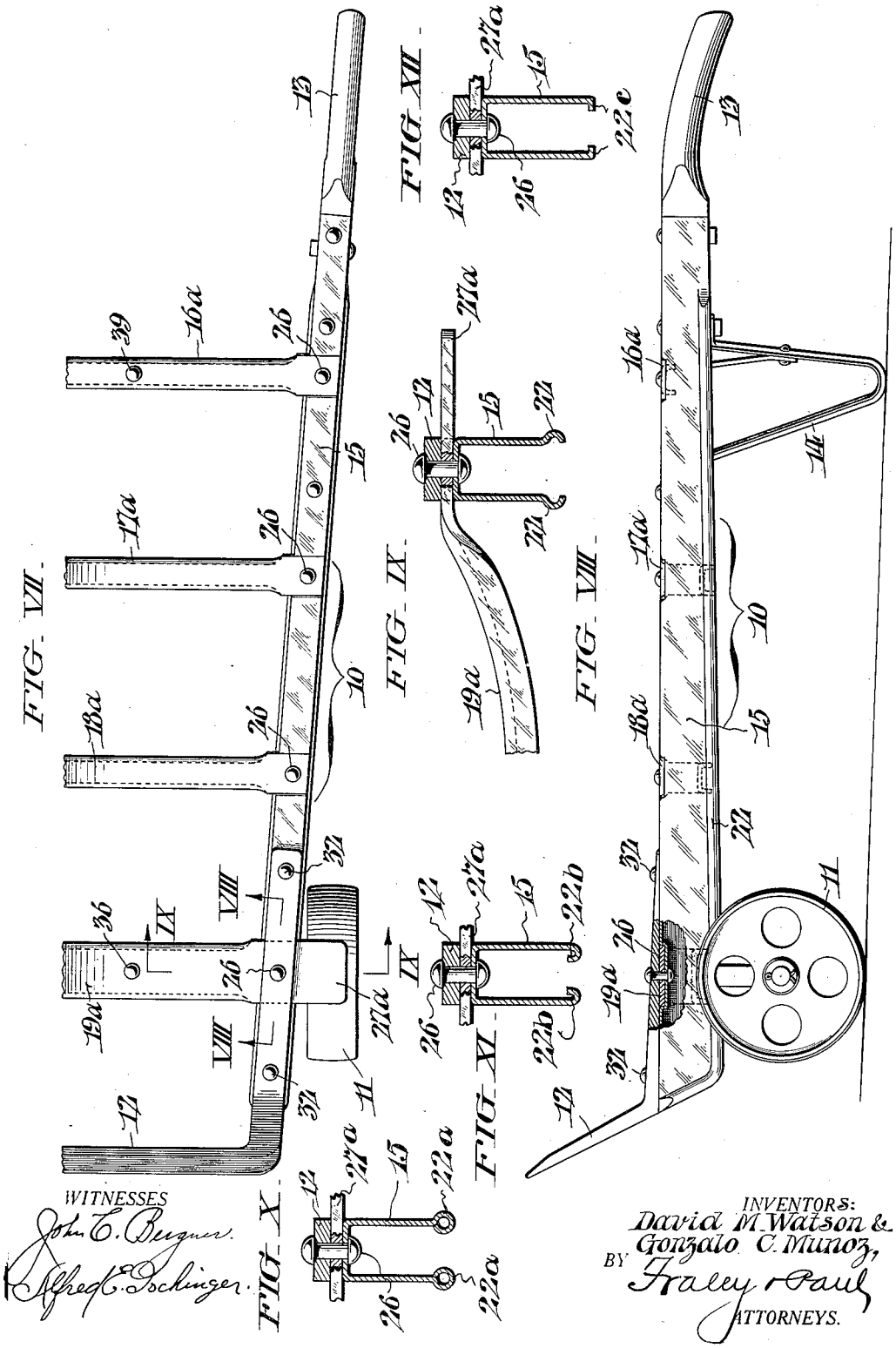

Patented May 9, 1933

1,908,618

UNITED STATES PATENT OFFICE

DAVID M. WATSON, OF ELKINS PARK, AND GONZALO C. MUÑOZ, OF PHILADELPHIA, PENNSYLVANIA, ASSIGNORS TO THE AMERICAN PULLEY COMPANY, OF PHILADELPHIA, PENNSYLVANIA, A CORPORATION OF PENNSYLVANIA

HAND TRUCK

Application filed March 11, 1925. Serial No. 14,622.

The present invention relates to hand trucks such as are commonly used for moving and shifting freight, baggage, packages, and bulky or heavy articles of various kinds. The object of the invention is to provide a strong, rugged, and durable truck, that can be easily and economically manufactured, and need not be excessively heavy or otherwise inconvenient to use. How these and other advantages can be realized through the invention will appear from the description hereinafter of a selected and preferred embodiment. The embodiment here shown represents a bent sheet metal type of construction, which is especially adaptable to the purposes of the invention.

In the drawings, Figs. I and II are front and rear perspective views of one form of sheet metal truck conveniently embodying the invention.

Figs. III and IV are plan and side views of the truck, on a larger scale and Figs. I and II.

Fig. V is a fragmentary end view of the truck, with one of the wheels and its axle in mid-section as indicated by the line V—V in Figs. III and IV.

Fig. VI shows a cross-section through one of the side members of the truck frame, taken as indicated by the line VI—VI in Figs. III and IV.

Figs. VII and VIII are views similar to Figs. III and IV, illustrating a somewhat different construction,—certain portions being broken away and in section in Fig. VIII as indicated by the line VIII—VIII in Fig. VII.

Fig. IX shows a detail section on the line IX—IX in Fig. VII, on a larger scale.

Figs. X, XI, and XII are cross-sections illustrating various forms of reinforcement for the edge of a side member of a truck.

The truck here shown is of an ordinary type, comprising a frame 10 with wheels 11, 11 and upstanding nose-piece 12 at one end, and handles 13, 13 at the other end. It has also feet or legs 14, 14 near the end where the handles 13, 13 are attached. Its frame 10 comprises diverging side members or sills 15, 15, united by the nose 12 and by cross members 16, 17, 18, and 19. The cross member 16 adjacent the handles 13, 13 is straight; the others (17, 18, and 19) are in the present instance curved or bowed downward, to accommodate the curvature of a barrel, for example. The wheels 11, 11 are mounted, as usual, on the rounded ends of a transverse axle bar 20, itself carried by brackets 21, 21 attached to the side members 15, 15. The feet 14, 14 are also attached to these side members 15, 15.

The sides 15, 15 are of sheet metal bent to a deep channel section, and embossed with approximately half round reinforcing ridges or beads 22 along the edges. These beads 22, 22 serve as bottom flanges to strengthen the members 15, 15 against bending in every direction. Beyond the wheels 11, 11, the ends of the members 15, 15 are closed by bending inward portions of the channel sides or flanges and welding their edges together, as shown at 22a in Fig. V. The handles 13 are of wood, with squared portions fitted into the ends of the side channels 15, and clamped tightly in place by bolts 23 through plates 24 whose edges fit between the sides or flanges of the channels 15, and also by bolts 25 extending across through the channel sides.

The cross members 16, 17, 18 and 19 are of channel section, somewhat shallower than the side members 15, 15. At or adjacent their ends, these cross channels 16, 17, 18, 19 are flattened by bending their flanges inward on their webs. The flattened portions of these cross members 16, 17, 18, 19 overlap the webs of the side channels 15, 15 externally (i. e., on top), being seated in shallow grooves across the backs of the channels which are formed by locally pressing in the backs of the channels,—as best shown in Figs. I and IV. These cross members 16, 17, 18, 19 are secured in place by rivets 26 through their flattened portions and the backs or webs of the channel members 15, 15. As here shown, the cross member 19 over the axle 20 is considerably wider than the rest, and its ends 27, 27 project outward over the wheels 11. The depending flanges 28, 28 on each end 27 of this member 19 abut against the outer side of the corresponding member 15, and thus brace the end 27 against them to resist stresses tending to bend the end 27 downward.

The axle brackets 21, 21 above mentioned extend up into the side channels 15, 15 to their bottoms or webs, and are thus braced laterally to a certain extent by edgewise engagement between the side flanges of the channels. Each bracket 21 may be formed of a flat strap-like metal strip or bar, bent to a V-shape, with upper ends bent outward to form feet 31, 31 which are riveted to the web of the side channel 15 at 32. The strips forming these brackets 21, 21 are preferably embossed with central longitudinal bead-like ridges or corrugations 33, as best shown in Fig. II. The mid-portion of each bracket strip is doubled upward to form squared U-seats for the axle bar 20, and is attached to it by a rivet 34. The brackets 21, 21 may be further braced transversely by means of a metal strap bar or strip 35 whose mid-portion is riveted to the lower side of the web of the cross member 19 at 36, and whose ends extend outward and downward and are secured to the axle bar 20 and the brackets 21, 21 by the rivets 34, 34 already mentioned. The nose-piece 12 lies or laps externally over the webs of the side channels 15, 15 and on the flattened portions of the member 19 above described, and is secured by the rivets 26, 26 and 32, 32 aforementioned.

Like the brackets 21, 21, the legs 14, 14 may be formed of V-bent flat metal strap bars or strips, with their upper ends turned outward to form feet. These strips may likewise be reinforced by longitudinal corrugations at 33, 33, as best shown in Figs. I, II and IV. One foot of each of these legs 14, 14 internally engages the corresponding channel web 15, and is riveted thereto at 37; the other foot of each leg lies against the lower side of the plate 24 above mentioned and is secured by one of the bolts 23. Besides the engagement of one end between the flanges of the corresponding side channel 15, each of the legs 14 is braced laterally by means of a flat strap-like metal bar or strip 38 whose mid-portion is riveted to the lower side of the web of the cross member 16 at 39, and whose ends are twisted into the plane of the shorter ends of the V-shaped legs 14 and riveted thereto at 41.

Figs. VII to IX illustrate a construction in which the cross channel members 16a, 17a, 18a, and 19a are flattened by bending their flanges outward into the plane of their webs, instead of inward on the webs as in the case of Figs. I to VI. In this case, the cross channels are shown of heavier metal than in Figs. III and IV, and their flanges not so deep. The outer ends 27a of the bar 19a over the wheels 11 are shown flattened out, just like the portions seated on the side channels 15.

In Figs. VII to IX, various parts and features are marked with the same reference characters as in Figs. I to VI, as a means of dispensing with merely repetitive description.

Instead of the embossed beaded form shown in Figs. I–IX, the reinforcement of the lower edges of the truck sides 15, 15 may have a different character, such, for example, as the circular hollow bead 22a shown in Fig. X, the upturned reverse flange or channel 22b shown in Fig. XI, or the simple inturned lateral flange 22c shown in Fig. XII.

Having thus described our invention, we claim:

A truck comprising channeled side members, and channeled cross members with the channel sides turned and flattened inward under the webs at the side members, the thus flattened portions of said cross members externally overlapping the channel webs of the side members and being secured to said webs, and the ends of a cross member extending outward beyond the side members, with the flanges of these outward extensions extending downward to abut against the side members and brace said outward extensions relative to said side members.

In testimony whereof, we have hereunto signed our names at Philadelphia, Pennsylvania, this 9th day of March 1925.

DAVID M. WATSON.
GONZALO C. MUÑOZ.